R. N. EHRHART.
VALVE MECHANISM.
APPLICATION FILED JUNE 19, 1917.
1,368,251.
Patented Feb. 15, 1921.
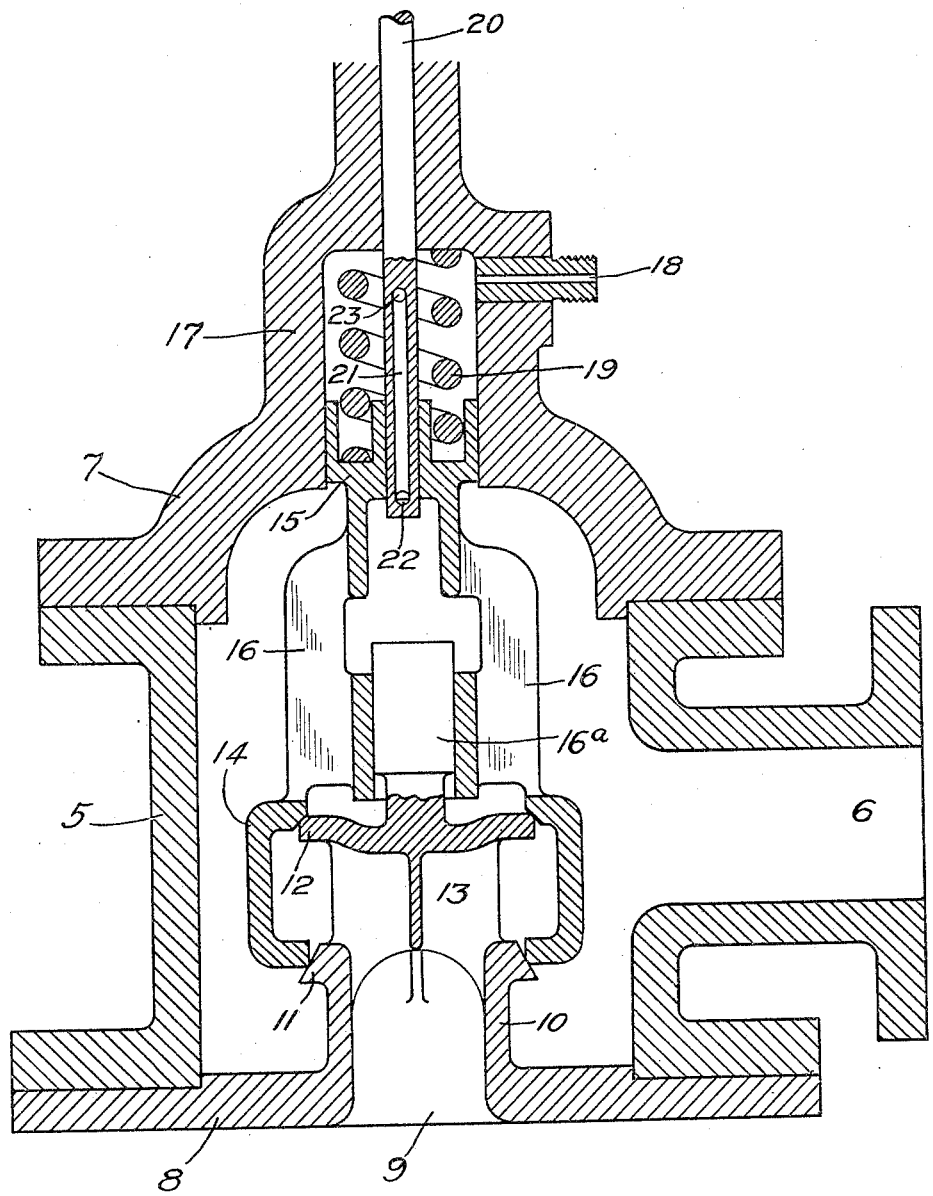
INVENTOR.
Raymond N. Ehrhart
BY
Green & McCallister,
his ATTORNEYS.

UNITED STATES PATENT OFFICE.

RAYMOND N. EHRHART, OF EDGEWOOD PARK, PENNSYLVANIA, ASSIGNOR TO WESTINGHOUSE ELECTRIC & MANUFACTURING COMPANY, A CORPORATION OF PENNSYLVANIA.

VALVE MECHANISM.

1,368,251.

Specification of Letters Patent. Patented Feb. 15, 1921.

Application filed June 19, 1917. Serial No. 175,641.

*To all whom it may concern:*

Be it known that I, RAYMOND N. EHRHART, a citizen of the United States, and a resident of Edgewood Park, in the county of Allegheny and State of Pennsylvania, have made a new and useful Invention in Valve Mechanism, of which the following is a specification.

This invention relates to valve mechanisms and has for an object to produce a new and improved valve mechanism which is responsive to movements of a relatively delicate and sensitive device, but is actuated by a relatively powerful force under the control of the sensitive device.

A further object is to produce a valve controlling relay mechanism which is simple and sensitive, and employs only the fluid controlled by the valve as actuating fluid.

A further object is to produce a simple and cheap valve mechanism in which a sensitive or delicate governing mechanism is adapted to positively control a relatively heavy valve.

These and other objects are attained by means of a valve mechanism embodying the features herein described, and illustrated in the single sheet drawing accompanying and forming a part hereof.

Relay mechanisms are frequently employed for controlling valves, especially where the valve to be controlled is relatively heavy and the controlling force relatively slight. My invention contemplates a valve and its controlling relay both of which are of unusually cheap and simple construction. Furthermore, relay mechanisms embodying my invention preferably employ as actuating fluid the fluid controlled by the valve, thereby making unnecessary an auxiliary system for supplying actuating fluid, for example oil, such as is commonly employed in many relay mechanisms.

The drawing is a diagrammatic sectional view of a valve and relay mechanism embodying my invention.

The valve illustrated is provided with a cylindrical casing 5, having an inlet port 6 on one side thereof, an upper closing head 7, and a lower head 8 provided with an outlet port 9. As shown, the outlet port 9 communicates with the interior of the casing 5 by means of a hollow standard 10 on the upper end of which two valve seats 11 and 12 are formed or mounted. The upper valve seat 12 is supported on webs 13 in such a manner that an annular opening, communicating with the hollow standard 10, is formed between the two seats 11 and 12.

A valve proper 14 controls the flow of fluid into the annular space between the two valve seats and hence from the inlet port 6 to the delivery port 9. As shown, this valve is in the form of a cylinder having a reentrant flange at each end for coöperating with the valve seats 11 and 12. This valve, as shown, is balanced against steam pressure because an equal area is exposed to unbalanced steam pressure at each end thereof. When the valve 14 is raised from the seats 11 and 12 the fluid controlled, hereinafter called steam, flows into the valve from above, around and past the seat 12; from below the valve, around and past the seat 11; and then into the hollow standard 10 and to the outlet port 9.

For actuating the valve 14, I have shown a piston 15 connected thereto by means of struts 16, which coöperate with a guide 16$^a$ formed or mounted on the upper valve seat 12, in guiding and centering the valve 12. As shown, the piston 15 is adapted to slide in a cylinder 17 formed on the upper cover 7 and opening at its lower end into the valve casing 5. The cylinder 17 is closed at its upper end except for a restricted orifice or leakoff port 18. This port may be provided with a valve of any kind if it is desirable to have an adjustable leakoff. Between the closed end of the cylinder 17 and the piston 15, I have shown a spring 19 for opposing the force of the steam pressure acting on the exposed lower side of the piston.

In order to control the differential pressure on the piston 15, and therefore to control its position and movements, I have provided a valve stem 20 which, as shown, is of relatively small size and extends down through the closed end of the cylinder 17 and through the piston 15. The inner end of the stem terminates inside the valve casing 5 shortly beyond the piston 15. As shown, the stem is provided with a longitudinal internal passageway 21 for establishing communication between the interior of the valve casing 5 and the upper end of the cylinder 17. This passageway is, in effect, a bypass through or around the piston 15 and terminates at its inner end in a transverse hole or port 22 near the inner end of the stem 20. The effectiveness of the passageway as a bypass is varied by moving the stem longitudinally so as to move the port 22 into or out of the piston and to thereby vary the size of the opening. Above the piston 15 the passageway 21 communicates with the cylinder 17 by means of a transverse hole 23, which is preferably spaced so far from the piston that it is always open. The cross sectional area of the passageway 21 is larger than the cross sectional area of the leakoff 18.

In operation the stem 20 may be moved by hand or by any controlling device, such for example, as a speed governor. When the stem 20 is moved inwardly so as to open the port 22, steam from the interior of the valve casing 5 passes through the passageway 21 into the cylinder 17 beyond the piston 15. The leakoff 18 is so restricted that it cannot carry off or exhaust the steam as rapidly as the ports and passageway in the stem can admit it, consequently the steam pressure in the cylinder 17 will build up unless checked, so as to equal, or nearly equal, the pressure of the steam in the casing 5. When the steam pressure in the cylinder 17 has reached such an amount that its force on the piston 15 plus the force of the spring 19 is sufficient to more than balance the force of the steam pressure on the exposed side of the piston 15, the piston will be moved toward the open end of the cylinder 17, and by reason of the connecting struts 16, will move the valve 14 in the closing direction. This movement itself will cause the piston 15 to reduce the size of the opening of the port 22 to such an extent that the rate of inflow into the cylinder 17 substantially equals the rate of outflow at the leakoff; consequently the piston will quickly reach a position of equilibrium and will remain there until the stem 20 is again moved.

If the stem 20 is moved in an outward direction the size of the opening of the port 22 will be restricted, or the port may be completely closed. The inflow of steam into the cylinder 17 is therefore either reduced or completely shut off and, as the leakoff 18 is always open, the pressure of the steam in the cylinder will fall. As soon as this pressure is reduced to such an extent that its force on the piston 15, plus the force of the spring 19 becomes less than the force of the steam pressure on the exposed side of the piston, an outward movement of the latter will take place and the valve 14 will be moved in the opening direction. This movement will also cause the port 22 to be opened again so as to equalize the forces on the piston 15 and to thereby cause the piston to retain its new position until the stem 20 is again moved. Obviously the piston 15 must follow closely any movement of the stem 20 as the ultimate moving force, which will be called into play by any undue lag of the piston, will be either the full force of the spring 19 or the total steam pressure on the inner face of the piston 15 minus only the force of the spring 19. By properly proportioning the diameter of the piston and the strength of the spring these forces may be made as large as desired and within practical limitations the controlling stem may be made as light and sensitive as desired.

The apparatus illustrated as an embodiment of my invention has the advantages of simplicity, compactness and reliability. A further advantage is the elimination of all auxiliary systems for supplying separate actuating fluid for the relay mechanism. It will, of course, be understood that a separate system may be employed, but I preferably employ only the steam controlled as the actuating fluid.

While I have described and illustrated but one embodiment of my invention, it will be apparent to those skilled in the art that various changes, modifications, additions and omissions may be made in the apparatus described and illustrated without departing from the spirit and scope of my invention as set forth by the appended claims.

What I claim is:

1. A valve mechanism comprising a valve, pressure responsive means for controlling the valve, exposed on one side to the pressure surrounding the valve so that the pressure thereon tends to open the valve, means for constantly exhausting fluid from the unexposed side of the said pressure responsive means, yielding means constantly tending to close the valve in opposition to the pressure tending to open it, means for supplying fluid to the unexposed side of the pressure responsive means in greater quantity than fluid is exhausted by the fluid exhausting means, whereby the pressure on the said unexposed side of the pressure responsive means is increased, and means for controlling the said fluid supplying means.

2. A valve mechanism comprising a valve, a pressure responsive piston for controlling the valve, exposed on one end to the pressure surrounding the valve so that the pressure thereon tends to open the valve, means for constantly exhausting fluid from the unexposed side of the piston, yielding means constantly tending to close the valve in opposition to the pressure tending to open it, and a pilot valve coöperating with the said piston provided with a passage adapted to permit the passage of fluid from the exposed side of the said piston to the unexposed side thereof in greater quantity than fluid is exhausted by the fluid exhausting means whereby the pressure on the said unexposed side of the piston is increased.

3. A valve mechanism comprising a valve, a cylinder communicating at one end with the valve chamber and at the other end provided with a constantly open exhaust port, a valve operating piston disposed in the cylinder between the said port and the valve chamber responsive to fluid pressure in the valve chamber and adapted to be moved to open position by fluid pressure in the valve chamber, a spring within the cylinder adapted to move the piston to closed position when the pressure within the cylinder bears a determined relation with respect to that in the valve chamber, and a means adapted to supply fluid to the cylinder in greater quantity than fluid is exhausted through the said port and controlled by movements of the said piston.

4. The combination with a valve for controlling the delivery of fluid under pressure and actuated by a pressure responsive piston exposed to the said fluid and having an exposed area less than that of the valve outlet, of a means for balancing the said valve whereby fluid pressure surrounding the valve and acting on the exposed area of the said piston causes the piston to be actuated so as to open the valve, and means for balancing the pressure on the exposed area of the said piston whereby the said piston may be maintained in various determined operative positions.

5. A valve mechanism having a casing provided with an inlet and an outlet port, a pair of alined annular valve seats spaced apart so that fluid passing in or out of one of the said ports flows between the seats, one of said seats having a conical surface and the other an angular surface forming a contact ridge, a cylindrical valve open at both ends, inclosed by the casing and having a reëntrant flange on one end provided with an angular seat forming a contact ridge adapted to coöperate with the conical valve seat, and having a reëntrant flange on the other end having a conical seat adapted to coöperate with the angular valve seat, whereby the passage between the seats is closed when the valve is moved into contact with the valve seats, and means for actuating the valve.

In testimony whereof, I have hereunto subscribed my name this 18th day of June, 1917.

RAYMOND N. EHRHART.

Witness:
C. W. McGHEE.